US012491390B2

(12) United States Patent
Acero

(10) Patent No.: US 12,491,390 B2
(45) Date of Patent: Dec. 9, 2025

(54) PORTABLE WILDFIRE CONTROL ASSEMBLY

(71) Applicant: Eustaquio Acero, Surprise, AZ (US)

(72) Inventor: Eustaquio Acero, Surprise, AZ (US)

( * ) Notice: Subject to any disclaimer, the term of this patent is extended or adjusted under 35 U.S.C. 154(b) by 384 days.

(21) Appl. No.: 18/091,101

(22) Filed: Dec. 29, 2022

(65) Prior Publication Data

US 2024/0216732 A1 Jul. 4, 2024

(51) Int. Cl.
*A62C 3/02* (2006.01)
*A62C 31/28* (2006.01)

(52) U.S. Cl.
CPC ............ *A62C 3/0292* (2013.01); *A62C 31/28* (2013.01)

(58) Field of Classification Search
CPC ........ A62C 3/0292; A62C 31/28; A62C 31/24
See application file for complete search history.

(56) References Cited

U.S. PATENT DOCUMENTS

| | | | | |
|---|---|---|---|---|
| 483,001 A * | 9/1892 | Hughes | A62C 31/24 182/115 |
| 4,037,664 A * | 7/1977 | Gibson | A62C 27/00 239/149 |
| D797,891 S | 9/2017 | Wang | |
| 11,065,484 B2 | 7/2021 | Bakhos | |
| 2010/0071917 A1 | 3/2010 | Lalouz | |
| 2011/0094761 A1 | 4/2011 | Bollens | |
| 2013/0062080 A1 | 3/2013 | Tobin | |
| 2013/0168110 A1* | 7/2013 | Baribbi | A62C 31/28 169/25 |

FOREIGN PATENT DOCUMENTS

| | | | |
|---|---|---|---|
| AU | 2002361669 A1 * | 6/2003 | B05B 15/0233 |

* cited by examiner

*Primary Examiner* — Steven M Cernoch

(57) ABSTRACT

A portable wildfire control assembly includes a trailer that is towable behind a tow vehicle. A tower is mounted to the trailer and the tower is comprised of a plurality of sections that slidably engage each other such that the tower is positionable between a collapsed position or an elongated position. An actuator is mounted to the tower and the actuator urges the tower into the elongated position or the collapsed position. A sprinkler head is mounted to the tower and the sprinkler head is fluidly attachable to a fluid source thereby facilitating the sprinkler head to spray the fluid in a strategic location. In this way the sprinkler head can inhibit a wildfire from spreading into the strategic location.

7 Claims, 6 Drawing Sheets

PORTABLE WILDFIRE CONTROL ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to wildfire control devices and more particularly pertains to a new wildfire control device for controlling the direction of a wildfire. The device includes a trailer and a tower mounted to the trailer that is positionable between a collapsed position and an elongated position. A sprinkler head is mounted to the tower and the sprinkler head is fluidly attachable to a water source. In this way the sprinkler head can spray water from an elevated position for soaking an area with water to inhibit a wildfire from burning the area.

(2) Description of Related Art Including Information Disclosed Under 37 CFR 1.97 and 1.98

The prior art relates to wildfire control devices including a mobile firefighting device that includes a trailer, a fluid supply mounted to the trailer and a monitor mounted the trailer for spraying fluid from the fluid supply. The prior art discloses a firefighting device that includes a tripod with extendable legs and a spray head mounted atop the tripod for spraying water. The prior art discloses a sprinkler head that includes a tripod with extendable legs. The prior art discloses a home fire protection device that includes a circuit of sprinklers disposed on a house and a pond employed as a fluid reservoir. The prior art discloses a portable firefighting device that includes a cart, a pump mounted to the cart and a rotatable sprinkler attached to the cart for spraying water from the pump.

(h) Brief Summary of the Invention

An embodiment of the disclosure meets the needs presented above by generally comprising a trailer that is towable behind a tow vehicle. A tower is mounted to the trailer and the tower is comprised of a plurality of sections that slidably engage each other such that the tower is positionable between a collapsed position or an elongated position. An actuator is mounted to the tower and the actuator urges the tower into the elongated position or the collapsed position. A sprinkler head is mounted to the tower and the sprinkler head is fluidly attachable to a fluid source thereby facilitating the sprinkler head to spray the fluid in a strategic location. In this way the sprinkler head can inhibit a wildfire from spreading into the strategic location.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
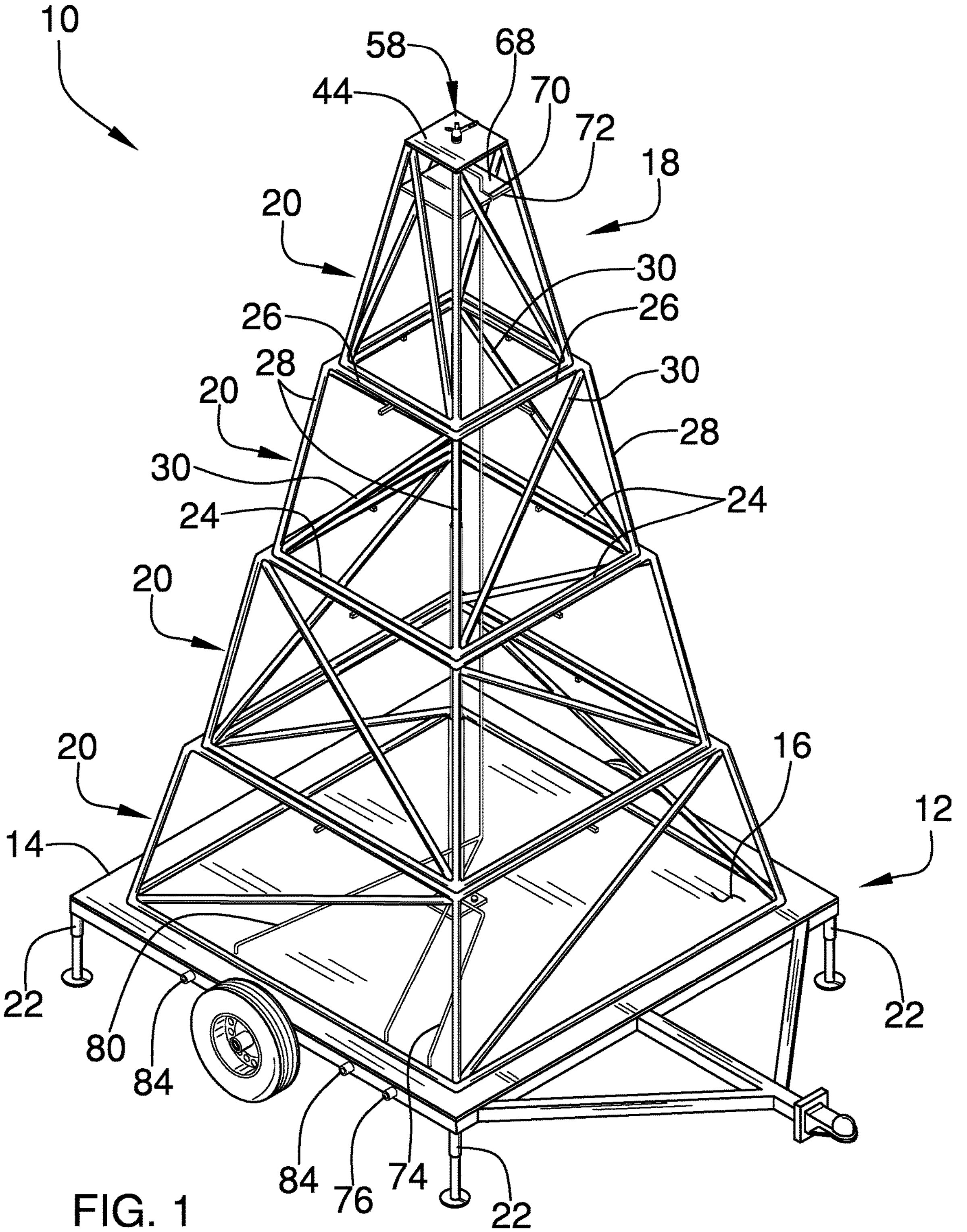
FIG. 1 is a perspective view of a portable wildfire control assembly according to an embodiment of the disclosure.
Figure 2:
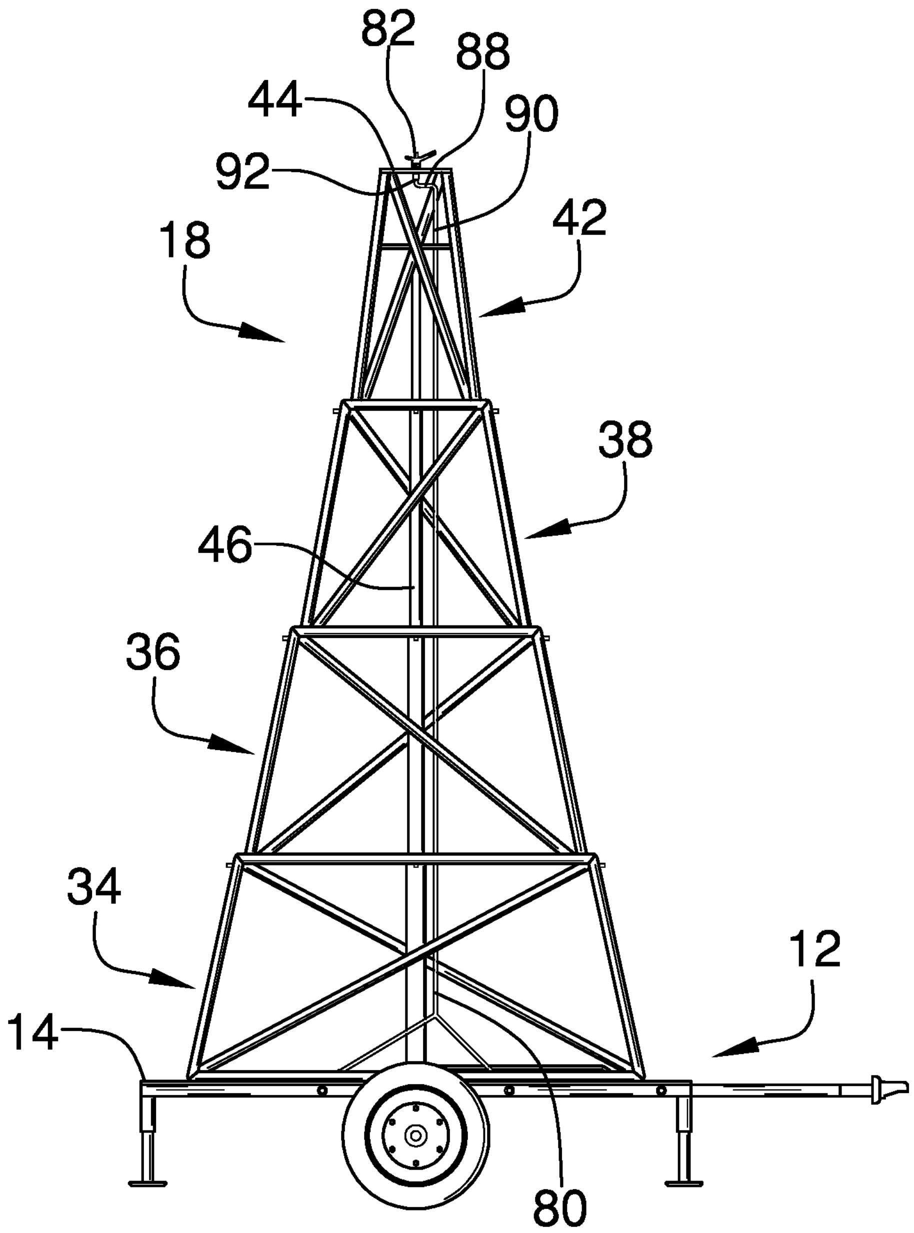
FIG. 2 is a right side view of an embodiment of the disclosure showing a tower in an elongated position.
Figure 3:
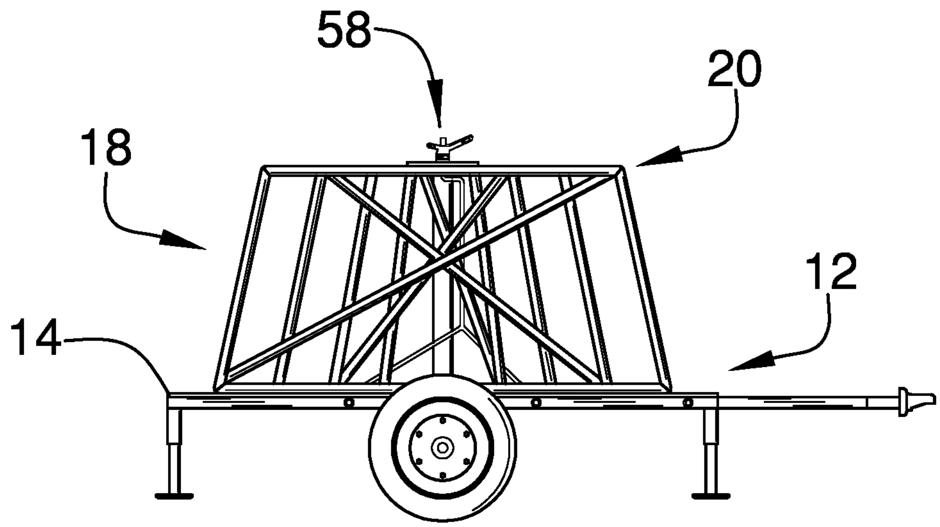
FIG. 3 is a right side view of an embodiment of the disclosure showing a tower in a collapsed position.
Figure 4:
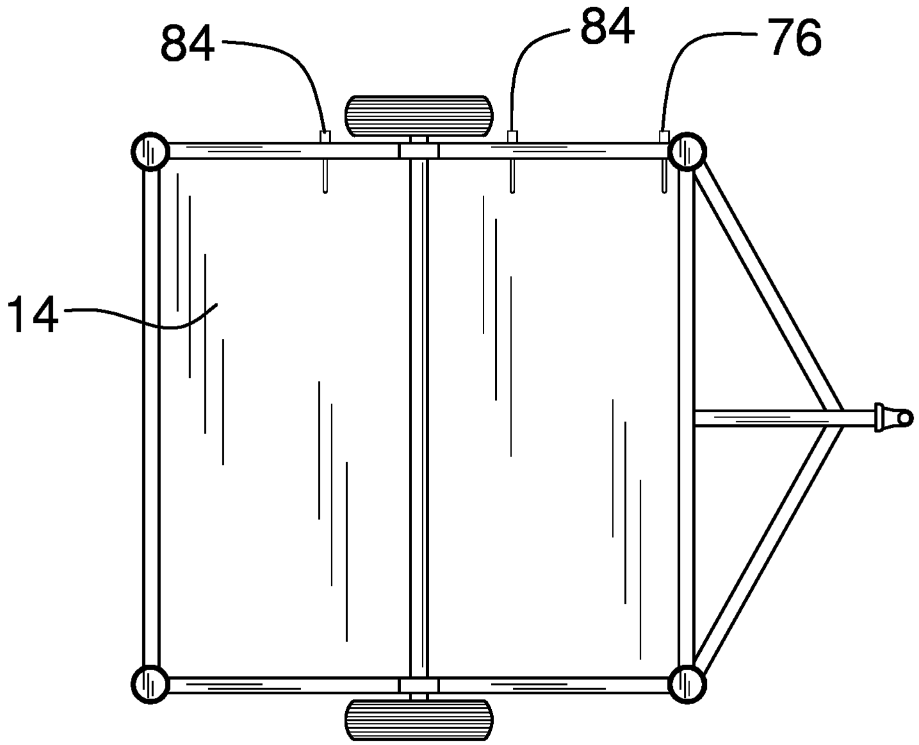
FIG. 4 is a bottom view of an embodiment of the disclosure.
Figure 5:
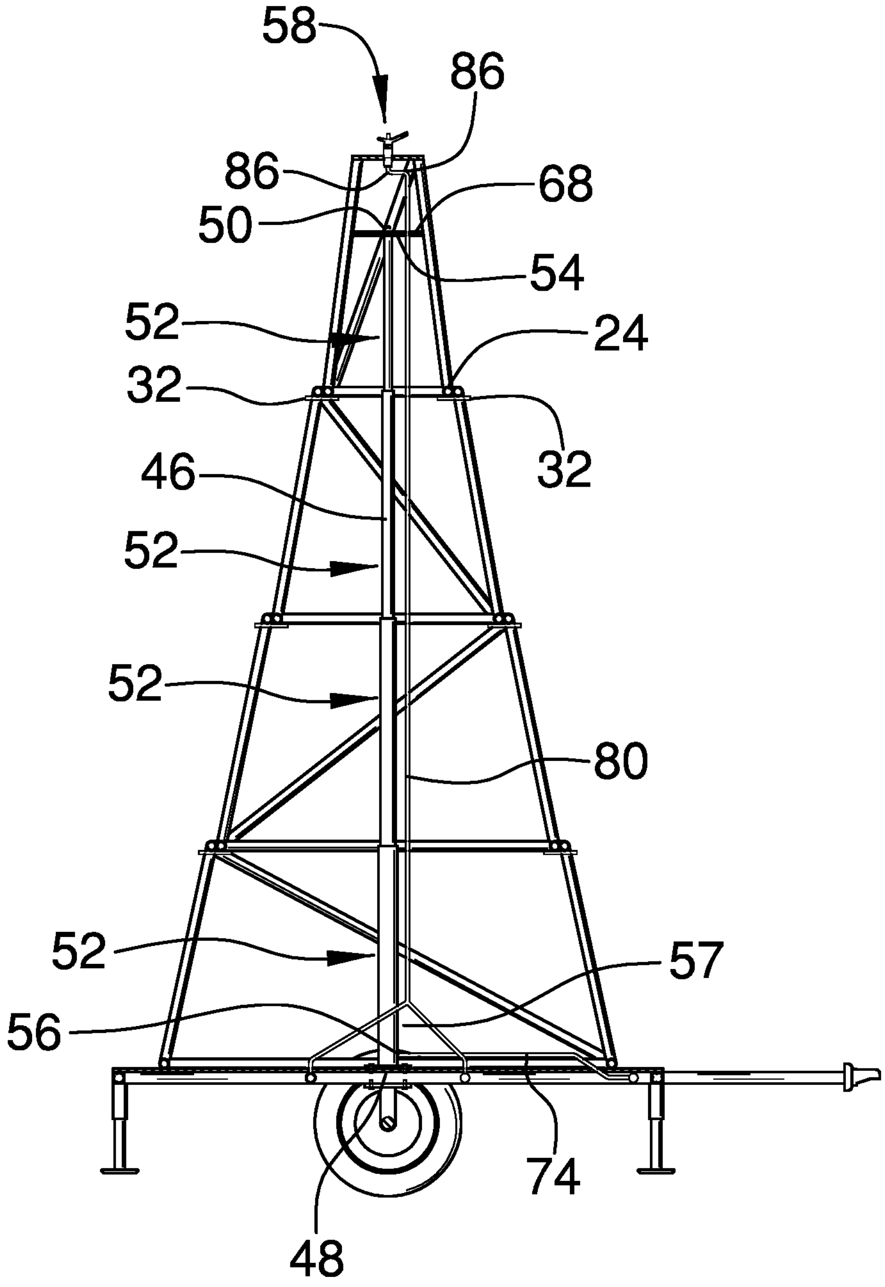
FIG. 5 is a right side cut-away view of an embodiment of the disclosure.
Figure 6:
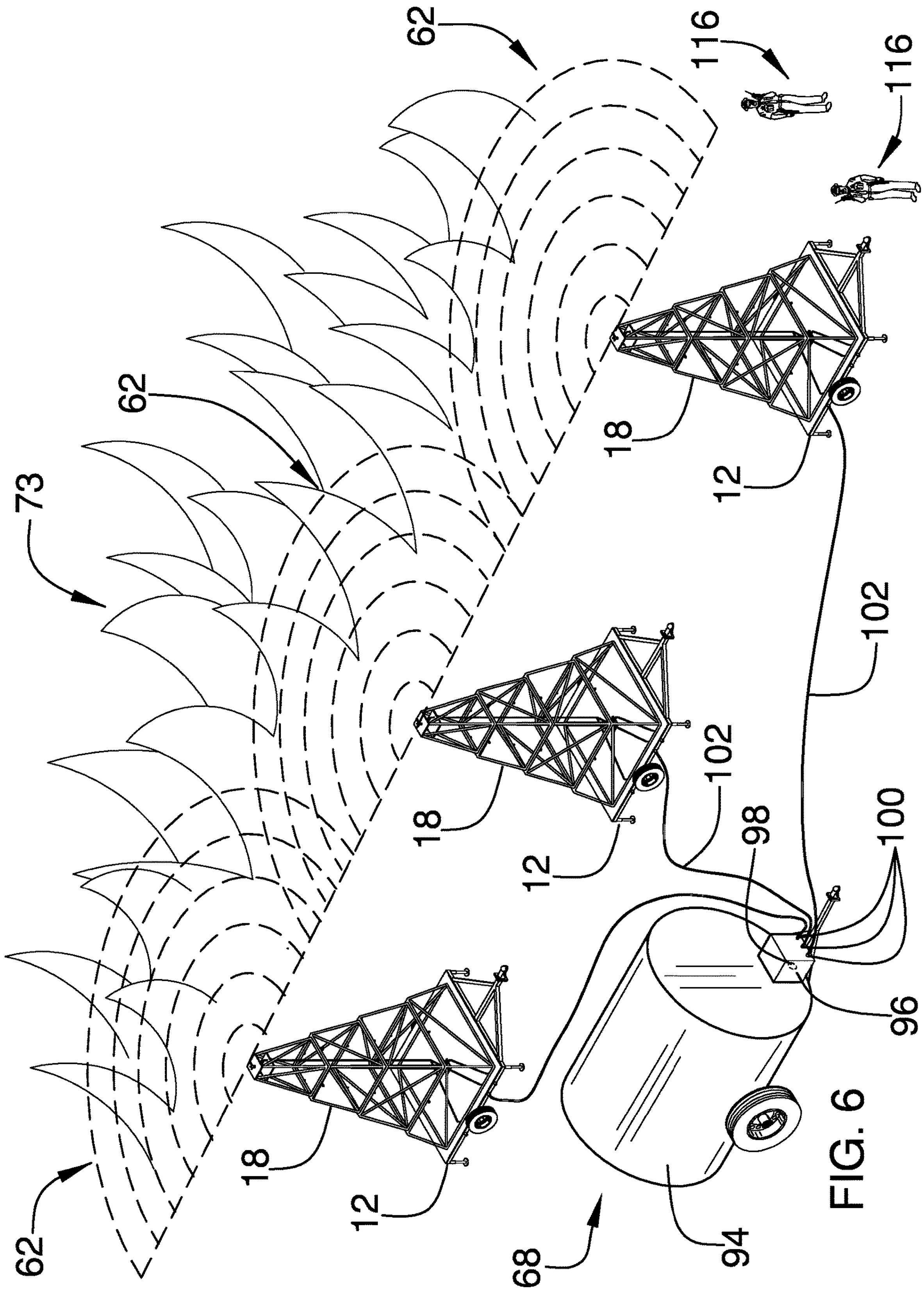
FIG. 6 is a perspective in-use view of an embodiment of the disclosure.

With reference now to the drawings, and in particular to FIGS. 1 through 7 thereof, a new wildfire control device embodying the principles and concepts of an embodiment of the disclosure and generally designated by the reference numeral 10 will be described.

As best illustrated in FIGS. 1 through 7, the portable wildfire control assembly 10 generally comprises a trailer 12 that is towable behind a tow vehicle and the trailer 12 has a bed 14 which has a top surface 16. The trailer 12 may include a hitch, wheels and other components that are common to trailers. A tower 18 is provided and the tower 18 is comprised of a plurality of sections 20 which slidably engage each other such that the tower 18 is positionable between a collapsed position or an elongated position. The tower 18 is mounted to the trailer 12 such that the tower 18 extends upwardly from the trailer 12 when the tower 18 is positioned in the elongated position. Furthermore, the trailer 12 may include support legs 22 which can be extended downwardly from the bed 14 to inhibit the trailer 12 from tipping when the tower 18 is positioned in the elongated position.

Each of the sections 20 comprises a plurality of bottom members 24 which intersects each other at a perpendicular angle such that the plurality of bottom members 24 defines a rectangle. Each of the sections 20 includes a plurality of top members 26 which intersect each other at a perpendicular angle such that the plurality of top members 26 defines a rectangle. Furthermore, each of the plurality of top members 26 has a length that is less than a length of each of the plurality of bottom members 24. In this way the rectangle defined by the plurality of top members 26 has a perimeter that is less than a perimeter of the rectangle defined by the plurality of bottom members 24.

Each of the sections 20 includes a plurality of vertical members 28 each extending between a respective one of the bottom members 24 and a respective one of the top members 26. In this way the plurality of top members 26 is spaced upwardly from the plurality of bottom members 24 such that each of the sections 20 has a trapezoidal shape. Each of the sections 20 includes a plurality of angled members 30 each angling between a respective one of the plurality of top members 26 and a respective one of the bottom members 24. Additionally, each of the sections 20 includes a plurality of stop bars 32 each coupled to and extending laterally away from a respective one of the plurality of bottom members 24. Each of the plurality of stop bars 32 is perpendicularly oriented with the respective bottom member 24 having the plurality of stop bars 32 extending outwardly from the trapezoidal shape defined by the sections 20.

The plurality of sections 20 includes a bottom section 34, a first middle section 36, a second middle section 38 and a top section 42. The tower 18 includes a top plate 44 that is fixed on the plurality of top members 26 associated with the top section 42. The stop bars 32 associated with the first middle section 36 abuts a respective one of the top members 26 associated with the bottom section 34 when the tower 18 is positioned in the elongated position. The stop bars 32 associated with the second middle section 38 abuts a respective one of the top members 26 associated with the first middle section 36 when the tower 18 is positioned in the elongated position. Additionally, the stop bars 32 associated with the top section 42 abuts a respective one of the top members 26 associated with the second middle section 38 when the tower 18 is positioned in the elongated position. Furthermore, the plurality of sections 20 is nested within each other when the tower 18 is in positioned in the collapsed position. The tower 18 may have a height ranging between approximately 3.0 meters and 6.0 meters.

An actuator 46 is mounted to the tower 18 and the actuator 46 is actuatable between an extended condition or a retracted condition. The actuator 46 urges the tower 18 into the elongated position when the actuator 46 is in the extended condition. Conversely, the actuator 46 urges the tower 18 into the collapsed position when the actuator 46 is in the retracted condition. The actuator 46 has a bottom end 48 and a top end 50 and the actuator 46 includes a plurality of sections 52 which slidably engage each other such that the actuator 46 has a telescopically adjustable height.

A lower plate 68 is provided which is attached to the plurality of vertical members 28 of the top section 42 such that the lower plate 68 lies on a plane oriented parallel with said top plate 44. Additionally, the lower plate 68 has a slot 70 extending inwardly on a perimeter edge 72 of the top plate 44. The bottom end 48 of the actuator 46 is attached to the top surface 16 of the bed 14 of the trailer 12. The top end 50 of the actuator 46 is attached to a lower surface 54 of the lower plate 68. The actuator 46 is substantially hollow and each of the sections 52 of the actuator 46 is in fluid communication with each other. The actuator 46 has an air input 56 that is fluidly integrated into a lowermost one of the plurality of sections 57 of the actuator 46. Furthermore, the actuator 46 may comprise a pneumatic actuator or the like.

A sprinkler head 58 is provided and the sprinkler head 58 is mounted to the tower 18. The sprinkler head 58 is fluidly attachable to a fluid source 60 thereby facilitating the sprinkler head 58 to spray a fluid 62 in a strategic location. In this way the sprinkler head 58 can be employed to inhibit a wildfire 73 from spreading into the strategic location. The sprinkler head 58 is mounted to the top plate 44 on the top section 42 of the tower 18 and the sprinkler head 58 has an inlet port 64 and an outlet port 66.

An air conduit 74 is fluidly attached to the air input 56 on the actuator 46 and the air conduit 74 has an air inlet 76 that is located on the trailer 12. The air conduit 74 is fluidly attachable to a source of compressed air 78 thereby facilitating the actuator 46 to receive compressed air for urging the actuator 46 into the extended condition. A fluid conduit 80 is provided which has a fluid outlet 82 and a pair of fluid inlets 84. The fluid outlet 82 is fluidly attached to the inlet port 64 on the sprinkler head 58 and each of the fluid inlets 84 is located on the trailer 12. Additionally, the fluid conduit 80 is comprised of a deformable material thereby facilitating the fluid conduit 80 to be coiled on the trailer 12 when the tower 18 is positioned in the collapsed position. The fluid conduit 80 has a pair of bends 86 that define a horizontal section 88 extending between a lower section 90 and an upper section 92. The lower section 90 extends through the slot 70 in the lower plate 68 such that the horizontal section 88 is positioned between the lower plate 68 and the top plate 44 and the upper section 92 is directed toward a center of the top plate 44 to engage the inlet port 64 on the sprinkler head 58.

A fluid tank 94 is mounted to a fluid trailer 12 and the fluid tank 94 contains the fluid 62 which may be water or other flame suppressing fluid. A pump 96 is attached to the fluid tank 94 and the pump 96 has an intake 98 and a plurality of exhausts 100. The intake 98 is in fluid communication with an interior of the fluid tank 94 thereby facilitating the pump 96 to urge the fluid in the fluid tank 94 outwardly through the pair of exhausts 100 when the pump 96 is turned on. The pump 96 may comprise an electric fluid pump or other similar type of fluid pump. A fluid hose 102 is fluidly attachable between a respective one of the exhausts 100 on the pump 96 and a respective one of the pair of fluid inlets 84 of the fluid conduit 80 thereby facilitating the pump 96 to deliver the fluid to the sprinkler head 58.

Figure 7:
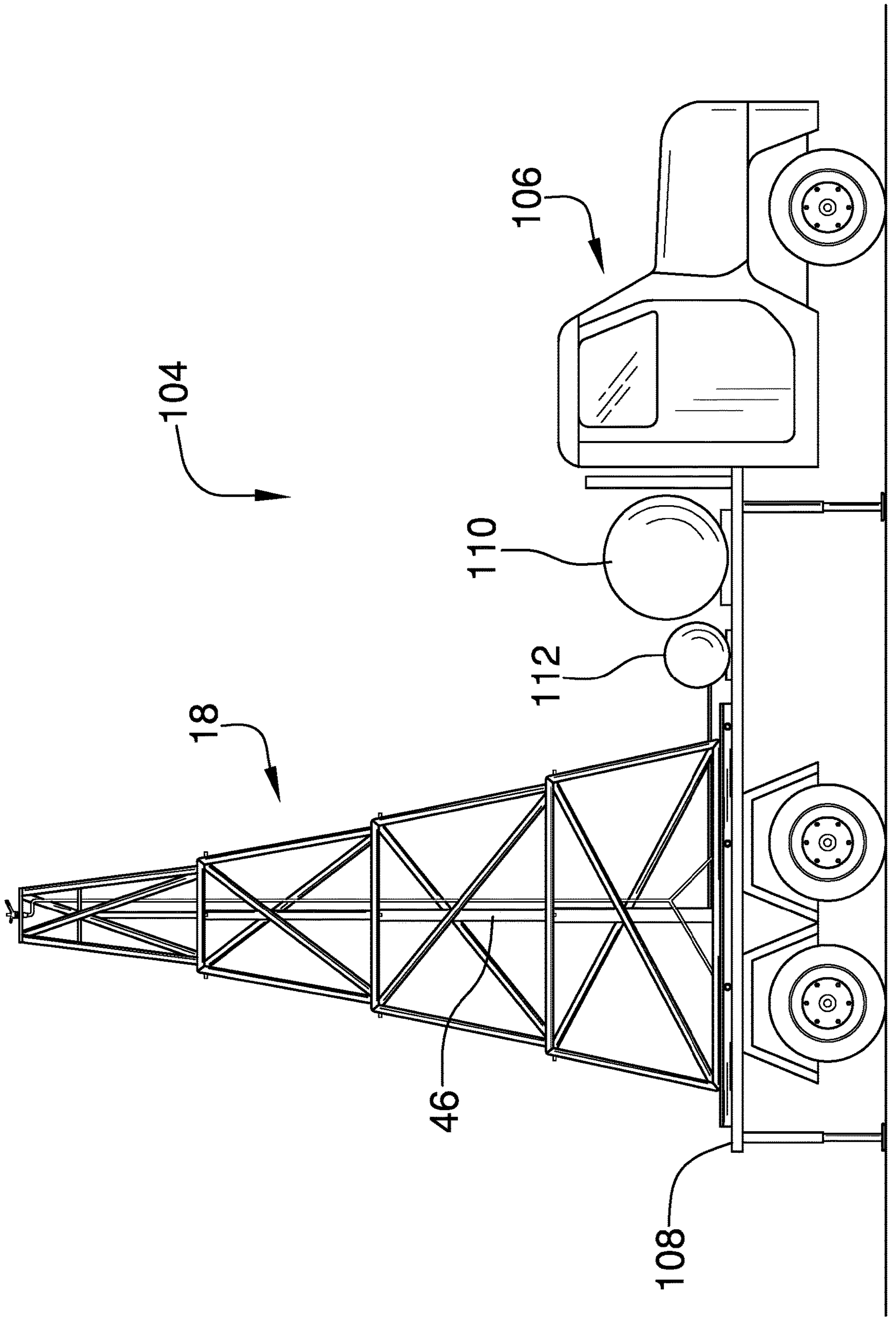
FIG. 7 is a right side view of an alternative embodiment of the disclosure.

In an alternative embodiment 104 as is most clearly shown in FIG. 7, the assembly includes a truck 106 that has a flatbed 108. The tower 18 is mounted to the flatbed 108 and the actuator 46 is mounted to the flatbed 108. Continuing in the alternative embodiment 104, an air tank 110 is mounted to the flatbed 108 and an air compressor 112 is mounted to the flatbed 108. The air compressor 112 is fluidly coupled between the air tank 110 and the air conduit 74. Furthermore, the air tank 110 is pressurized by the air compressor 112 thereby facilitating the air tank 110 to supply pressure for a water source which is fluidly attached to a respective one of the fluid inlets 84 of the fluid conduit 80.

In use, the trailer 12 is towed to an area that is strategically located with respect to a wildfire 73 being fought by firefighters 116. The tower 18 is positioned in the elongated position and the fluid hose 102 is fluidly attached between the fluid conduit 80 and the pump 96 on the fluid trailer 12. In this way the sprinkler head 58 can spray the fluid over the area thereby soaking the area with the fluid. Thus, the direction of the wildfire 73 can be controlled by strategically locating multiple trailers 12 at various locations for controlling the wildfire 73 by soaking areas that have not yet been burned by the wildfire 73. In this way the firefighters 116 can stay ahead of the wildfire 73 while fighting the wildfire 73 thereby reducing the likelihood of injury or loss of life.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable wildfire control assembly for spraying water in a strategic area to control the direction of a wildfire, said assembly comprising:

a trailer being towable behind a tow vehicle;

a tower being comprised of a plurality of sections slidably engaging each other such that said tower is positionable between a collapsed position or an elongated position, said tower being mounted to said trailer such that said tower extends upwardly from said trailer when said tower is positioned in said elongated position;

an actuator being mounted to said tower, said actuator being actuatable between an extended condition or a retracted condition, said actuator urging said tower into said elongated position when said actuator is moved into said extended condition, said actuator urging said tower into said collapsed position when said actuator is moved into said retracted condition;

a sprinkler head being mounted to said tower, said sprinkler head being fluidly attachable to a fluid source thereby facilitating said sprinkler head to spray the fluid in a strategic location wherein said sprinkler head is configured to inhibit a wildfire from spreading into the strategic location;

wherein each of said sections comprises a plurality of bottom members intersecting each other at a perpendicular angle such that said plurality of bottom members defines a rectangle, a plurality of top members intersecting each other at a perpendicular angle such that said plurality of top members defines a rectangle, each of said plurality of top members having a length being less than a length of each of said plurality of bottom members such that said rectangle defined by said plurality of top members has a perimeter that is less than a perimeter of said rectangle defined by said plurality of bottom members, a plurality of vertical members each extending between a respective one of said bottom members and a respective one of said top members such that said plurality of top members is spaced upwardly from said plurality of bottom members such that each of said sections has a trapezoidal shape, a plurality of angled members each angling between a respective one of said plurality of top members and a respective one of said bottom members, and a plurality of stop bars each being coupled to and extending laterally away from a respective one of said plurality of bottom members, each of said plurality of stop bars being perpendicularly oriented with said respective bottom member having said plurality of stop bars extending outwardly from said trapezoidal shape defined by said sections;

wherein said plurality of sections includes a bottom section, a first middle section, a second middle section and a top section;

wherein said stop bars associated with said first middle section abuts a respective one of said top members associated with said bottom section when said tower is positioned in said elongated position;

wherein said stop bars associated with said second middle section abuts a respective one of said top members associated with said first middle section when said tower is positioned in said elongated position;

wherein said stop bars associated with said top section abuts a respective one of said top members associated with said second middle section when said tower is positioned in said elongated position;

wherein said trailer has a bed which has a top surface;

wherein said tower includes a top plate being fixed on said plurality of top members associated with said top section wherein said top plate is positioned at an uppermost extend of said top section;

wherein said actuator has a bottom end, said actuator including a plurality of sections which slidably engage each other such that said actuator has a telescopically adjustable height, said bottom end being attached to said top surface of said bed of said trailer, said actuator being substantially hollow, each of said sections of said actuator being in fluid communication with each other; and wherein said actuator has an air input being fluidly integrated into a lowermost one of said plurality of sections of said actuator.

2. The assembly according to claim 1, wherein said plurality of sections is nested within each other when said tower is positioned in said collapsed position.

3. The assembly according to claim 1, wherein:

said sprinkler head is mounted to said plate on said top section of said tower, said sprinkler having an inlet port and an outlet port; and said assembly includes a fluid conduit having a fluid outlet and a pair of fluid inlets, said fluid outlet being fluidly attached to said inlet port on said sprinkler head, each of said fluid inlets being located on said trailer, said fluid conduit being comprised of a deformable material thereby facilitating said fluid conduit to being coiled on said trailer when said tower is positioned in said collapsed position.

4. The assembly according to claim 3, further comprising:

a fluid tank being mounted to a fluid trailer, said fluid tank containing a fluid;

a pump being attached to said fluid tank, said pump having an intake and a plurality of exhausts, said intake being in fluid communication with an interior of said fluid tank thereby facilitating said pump to urge the fluid in said fluid tank outwardly through said plurality of exhausts when said pump is turned on; and a fluid hose being fluidly attachable between a respective one of said exhausts on said pump and a respective one of said pair of fluid inlets of said fluid conduit thereby facilitating said pump to deliver the fluid to said sprinkler head.

5. The assembly according to claim 1, further comprising an air conduit being fluidly attached to said air input on said actuator, said air conduit having an air inlet being located on said trailer, said air conduit being fluidly attachable to a source of compressed air thereby facilitating said actuator to receive compressed air for urging said actuator into said extended condition.

6. A portable wildfire control assembly for spraying water in a strategic area to control the direction of a wildfire, said assembly comprising:

a trailer being towable behind a tow vehicle, said trailer having a bed which has a top surface;

a tower being comprised of a plurality of sections slidably engaging each other such that said tower is positionable between a collapsed position or an elongated position, said tower being mounted to said trailer such that said tower extends upwardly from said trailer when said tower is positioned in said elongated position, each of said sections comprising:

a plurality of bottom members intersecting each other at a perpendicular angle such that said plurality of bottom members defines a rectangle;

a plurality of top members intersecting each other at a perpendicular angle such that said plurality of top members defines a rectangle, each of said plurality of top members having a length being less than a length of each of said plurality of bottom members such that said rectangle defined by said plurality of top members has a perimeter that is less than a perimeter of said rectangle defined by said plurality of bottom members;

a plurality of vertical members each extending between a respective one of said bottom members and a respective one of said top members such that said plurality of top members is spaced upwardly from said plurality of bottom members such that each of said sections has a trapezoidal shape;

a plurality of angled members each angling between a respective one of said plurality of top members and a respective one of said bottom members; and a plurality of stop bars each being coupled to and extending laterally away from a respective one of said plurality of bottom members, each of said plurality of stop bars being perpendicularly oriented with said respective bottom member having said plurality of stop bars extending outwardly from said trapezoidal shape defined by said sections;

wherein said plurality of sections includes a bottom section, a first middle section, a second middle section, and a top section;

wherein said tower includes a top plate being fixed on said plurality of top members associated with said top section wherein said top plate is positioned at an uppermost extend of said top section;

wherein said stop bars associated with said first middle section abuts a respective one of said top members associated with said bottom section when said tower is positioned in said elongated position;

wherein said stop bars associated with said second middle section abuts a respective one of said top members associated with said first middle section when said tower is positioned in said elongated position;

wherein said plurality of sections is nested within each other when said tower is positioned in said collapsed position;

an actuator being mounted to said tower, said actuator being actuatable between an extended condition or a retracted condition, said actuator urging said tower into said elongated position when said actuator is moved into said extended condition, said actuator urging said tower into said collapsed position when said actuator is moved into said retracted condition, said actuator having a bottom end, said actuator including a plurality of sections which slidably engage each other such that said actuator has a telescopically adjustable height, said bottom end being attached to said top surface of said bed of said trailer, said actuator being substantially hollow, each of said sections of said actuator being in fluid communication with each other, said actuator having an air input being fluidly integrated into a lowermost one of said plurality of sections of said actuator;

a sprinkler head being mounted to said tower, said sprinkler head being fluidly attachable to a fluid source thereby facilitating said sprinkler head to spray the fluid in a strategic location wherein said sprinkler head is configured to inhibit a wildfire from spreading into the strategic location, said sprinkler head being mounted to said plate on said top section of said tower, said sprinkler having an inlet port and an outlet port;

an air conduit being fluidly attached to said air input on said actuator, said air conduit having an air inlet being located on said trailer, said air conduit being fluidly attachable to a source of compressed air thereby facilitating said actuator to receive compressed air for urging said actuator into said extended condition;

a fluid conduit having a fluid outlet and a pair of fluid inlets, said fluid outlet being fluidly attached to said inlet port on said sprinkler head, each of said fluid inlets being located on said trailer, said fluid conduit being comprised of a deformable material thereby facilitating said fluid conduit to being coiled on said trailer when said tower is positioned in said collapsed position;

a fluid tank being mounted to a fluid trailer, said fluid tank containing a fluid;

a pump being attached to said fluid tank, said pump having an intake and a plurality of exhausts, said intake being in fluid communication with an interior of said fluid tank thereby facilitating said pump to urge the fluid in said fluid tank outwardly through said plurality of exhausts when said pump is turned on; and a fluid hose being fluidly attachable between a respective one of said exhausts on said pump and a respective one of said pair of fluid inlets of said fluid conduit thereby facilitating said pump to deliver the fluid to said sprinkler head.

7. The assembly according to claim 6, wherein:

said assembly includes a truck having a flatbed;

said tower is mounted to said flatbed;

said actuator is mounted to said flatbed;

said assembly includes an air tank being mounted to said flatbed; and an air compressor being mounted to said flatbed, said air compressor being fluidly coupled between said air tank and said air conduit, said air tank being pressurized by said air compressor thereby facilitating said air tank to supply pressure for a water source which is fluidly attached to a respective one of said fluid inlets of said fluid conduit.

* * * * *